(12) United States Patent
Reddy et al.

(10) Patent No.: US 7,113,302 B2
(45) Date of Patent: Sep. 26, 2006

(54) PRINTER WITH UNIFIED DISPLAY LIST AND BANDED DISPLAY LISTS

(75) Inventors: M. V. Ratna Reddy, Karnataka (IN); Vinod Arumugham Chettiar, Gujarat (IN)

(73) Assignee: Texas Instruments Incorporated, Dallas, TX (US)

( * ) Notice: Subject to any disclaimer, the term of this patent is extended or adjusted under 35 U.S.C. 154(b) by 971 days.

(21) Appl. No.: 10/051,569

(22) Filed: Jan. 17, 2002

(65) Prior Publication Data
US 2003/0095285 A1 May 22, 2003

Related U.S. Application Data

(60) Provisional application No. 60/329,959, filed on Oct. 16, 2001.

(51) Int. Cl.
G06F 15/00 (2006.01)
(52) U.S. Cl. .................................... 358/1.15
(58) Field of Classification Search ................ 358/1.1, 358/1.13, 1.15, 1.16; 715/526, 502; 707/1, 707/102, 104; 400/61
See application file for complete search history.

(56) References Cited

U.S. PATENT DOCUMENTS

| | | | |
|---|---|---|---|
| 6,052,200 A | 4/2000 | Mitani | |
| 6,100,998 A | 8/2000 | Nagao et al. | |
| 6,238,105 B1 | 5/2001 | Pardo | |
| 6,288,724 B1 | 9/2001 | Kumar et al. | |
| 6,510,246 B1 * | 1/2003 | Boliek et al. | 382/232 |
| RE38,732 E * | 5/2005 | Wood et al. | 358/1.15 |

* cited by examiner

Primary Examiner—Twyler Lamb
Assistant Examiner—Saeid Ebrahimi Dehkordy
(74) Attorney, Agent, or Firm—Robert D. Marshall, Jr.; W. James Brady; Frederick J. Telecky, Jr.

(57) ABSTRACT

A method is provided for generating an image having a plurality of bands. A page description representative of elements of the image is received from an external source. A display list buffer is then built that has a plurality of display list elements (DLE) derived from the page description, each display list element being representative of a corresponding graphic item. A banded display list is then built that is representative of the plurality of bands of the image. For each band of the plurality of bands, a set of templates is stored in the banded dismay list in which each template points to a DLE in the display list buffer for each corresponding graphic item that is spawned within the band. Each band is then rendered by using the set of templates stored for that band to access a corresponding set of DLEs from the display list buffer. In one embodiment, a printer includes a microprocessor with on-chip memory. All of the sets of templates for each of the plurality of bands can be loaded together into the on-chip memory along with a band buffer for rendering a band due to the relatively small size of the banded display list.

11 Claims, 2 Drawing Sheets

PRINTER WITH UNIFIED DISPLAY LIST AND BANDED DISPLAY LISTS

This application claims priority under 35 USC §119(e)(1) of Provisional Application No. 60/329,959, filed Oct. 16, 2001.

FIELD OF THE INVENTION

This invention generally relates to graphics processing, and more specifically to low-end printers using banding to reduce memory requirements, circuits, systems, and methods of making.

BACKGROUND OF THE INVENTION

Current printers, particularly printers adapted to connect to a local area network and service plural network users, employ a page description language. PostScript is an example of such a page description language. Page description languages are programming languages that allow compact, flexible and device independent description of a page. A print file in a page description language lists the text and graphics to be printed on the page described. The description of the objects to be printed must be rendered into a raster bitmap in a process called rasterization in order to be printed. Rasterization is the process of converting the page description into the individual dots making up the lines of the page in the order to be printed. This process enables the page to be printed by the print engine, which generally prints the page line by line from one edge to an opposite edge. The page rasterizer typically consists of an interpreter and a rasterizer. The interpreter parses the input data stream and creates drawing primitives, termed display list elements. The rasterizer does scan-conversion of these primitives.

Many objects in computer graphics applications and page description languages are described through polygons. Even curved shapes are generally approximated to nearest polygons and then rendered. To be printed or displayed these polygons must be converted into the scan technique used by the output device. Polygon scan conversion may be invoked thousands of times to render a graphics image into a print buffer. U.S. Pat. No. 6,288,724 entitled "Clipping and trapezoid decomposition of polygons for printing files in a page description language" describes techniques for doing this.

A page description language (PDL) such as PostScript, developed by Adobe Systems, is primarily a language for printing documents on laser printers, but it can be adapted to produce images on other types of devices. PostScript is the standard for desktop publishing because it is supported by image-setters, the very high-resolution printers used by service bureaus to produce camera-ready copy.

A PDL is generally an object-oriented language, meaning that it treats images, including fonts, as collections of geometrical objects rather than as bit maps. PostScript fonts are called outline fonts because the outline of each character is defined. They are also called scalable fonts because their size can be changed with PostScript commands. Given a single typeface definition, a PostScript printer can thus produce a multitude of fonts. In contrast, many non-PostScript printers represent fonts with bit maps. To print a bit-mapped typeface with different sizes, these printers require a complete set of bit maps for each size.

The principal advantage of object-oriented (vector) graphics over bit-mapped graphics is that object-oriented images take advantage of high-resolution output devices whereas bit-mapped images do not. Thus, an object-oriented graphics drawing looks much better when printed on a 600-dpi printer than on a 300-dpi printer. A bit-mapped image looks the same on both printers. In order to evaluate an object-oriented graphic object for printing, a printer contains a built-in interpreter that executes instructions that parses each object and prepares a rendered image. Interpreters of page description language typically process a page in a banded mode.

U.S. Pat. No. 6,052,200, entitled "Memory Management Method, Printing Control Device and Printing Apparatus" describes a prior art printer that uses banding and further describes a method to prevent memory overrun and deadlock from occurring.

SUMMARY OF THE INVENTION

In general, and in a form of the present invention a method is provided for generating an image having a plurality of bands. A page description representative of elements of the image is received from an external source. A display list buffer is then built that has a plurality of display list elements (DLE) derived from the page description, each display list element being representative of a corresponding graphic item. A banded display list is then built that is representative of the plurality of bands of the image. For each band of the plurality of bands, a set of templates is stored in the banded display list in which each template points to a DLE in the display list buffer for each corresponding graphic item that is spawned within the band. Each band is then rendered by using the se of templates stored for that band to access a corresponding set of DLEs from the display list buffer.

In accordance with the present invention, a printer that prints in a banded manner is provided. The printer comprises a microprocessor contained on a single integrated circuit connected to an on-chip memory within the integrated circuit, a print buffer memory connected to the microprocessor to receive rendered bands, and a print engine connected to receive each rendered band for printing. The microprocessor is operable to prepare a page having a plurality of bands for printing by receiving a page description representative of elements of the image; building a display list buffer having a plurality of display list elements (DLE) derived from the page description, each display list element being representative of a corresponding graphic item; building a banded display list representative of the plurality of bands of the image, wherein for each band of the plurality of bands a set of templates is stored in the banded display list in which each template points to a DLE in the display list buffer for each corresponding graphic item that is spawned within the band; and rendering each band by using the set of templates stored for that band to access a corresponding set of DLEs from the display list buffer. Advantageously, all of the sets of templates for each of the plurality of bands can be loaded together into the on-chip memory along with a band buffer for rendering a band due to the relatively small size of the banded display list.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the image processing system of FIG. 1, unless otherwise stated, and in which.

Corresponding numerals and symbols in the different figures and tables refer to corresponding parts unless otherwise indicated.

DETAILED DESCRIPTION OF EMBODIMENTS OF THE INVENTION

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Figure 1:
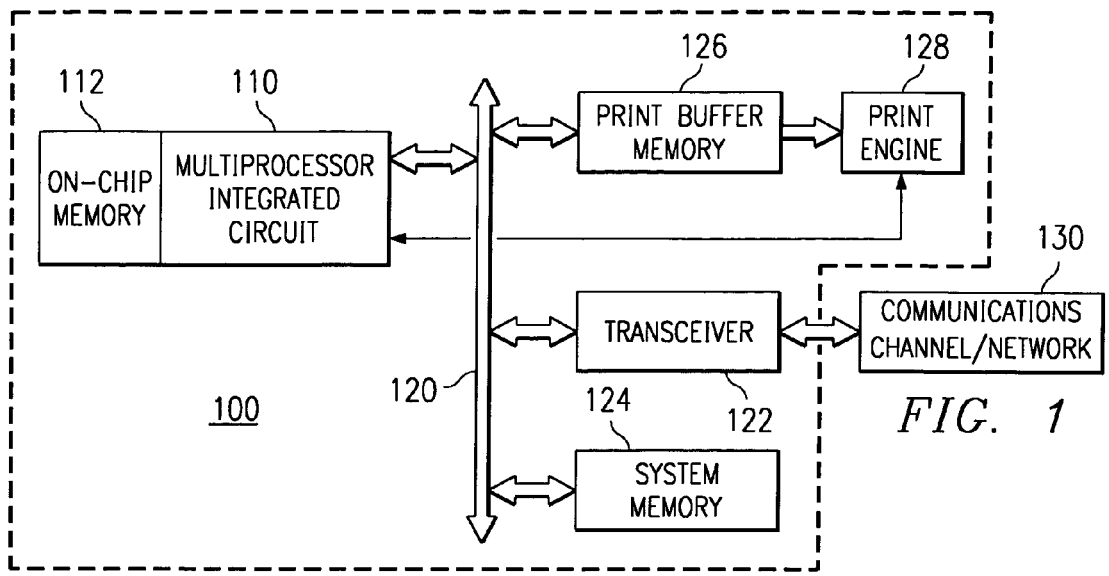
FIG. 1 is a block diagram of an image processing system that embodies the present invention.

FIG. 1 is a block diagram of an image processing system 100 that embodies the present invention. Image processing system 100 is a network printer including a multiprocessor integrated circuit 110 constructed for image and graphics processing. Details of such a circuit are described in detail in U.S. Pat. No. 6,288,724, entitled "Clipping And Trapezoid Decomposition Of Polygons For Printing Files In A Page Description Language" and will not be described in detail herein. In this embodiment, integrated circuit 110 contains multiple processors, however, in another embodiment a single processor may be embodied. The present invention is useful in both single processor and multiprocessor embodiments. Multiprocessor 110 provides data processing including data manipulation and computation for image operations of network printer system 100. On-chip memory 112 is included within processor circuit 110 and is accessible to the processors within circuit 110 in a faster manner than memory located off-chip.

Multiprocessor 110 is bi-directionally coupled to a network printer system bus 120. Transceiver 122 provides translation and bi-directional communication between network printer system bus 120 and a communications channel 130. Communications channel 130 is a local area internet network in this embodiment. Network printer system 100 responds to print requests received via communications channel 130 from requesting devices, not shown, connected to the local area network. Multiprocessor 110 provides translation of print jobs specified in a page description language, such as PostScript, into data and control signals for printing.

Transceiver 122 can have various capabilities in various embodiments, and may include, for example, an Ethernet card, a token ring card, a fax port, a scanner port, a serial bus port, and/or a Universal Serial Bus (USB) port. These network adapters may be the source of any number of print jobs for the printer. One or more parallel ports may also be included for connecting directly to a computer such that the computer is the source of print jobs.

System memory 124 is coupled to the network printer system bus 120. This memory may include video random access memory, dynamic random access memory, static random access memory, nonvolatile memory such as EPROM, FLASH or read only memory or a combination of these memory types. Multiprocessor 110 may be controlled either in wholly or partially by a program stored in memory 124. This memory may also store various types of graphic image data.

Multiprocessor 110 communicates with print buffer memory 126 for specification of a printable image via a pixel map. Each print image is rendered in a band by band manner into buffer memory 126. Multiprocessor 110 controls the image data stored in print buffer memory 126 via the network printer system bus 120. Data corresponding to this image is recalled from print buffer memory 126 and supplied to print engine 128. Print engine 128 provides the mechanism that places color dots on a printed page. Print engine 128 is further responsive to control signals from multiprocessor 110 for paper and print head control. Multiprocessor 110 determines and controls where print information is stored in print buffer memory 126. Subsequently, during readout from print buffer memory 126, multiprocessor integrated circuit 110 determines the readout sequence from print buffer memory 126, the addresses to be accessed, and control information needed to produce the desired printed image by print engine 128.

Multiprocessor 110 can be a processor separately fabricated on a single integrated circuit or a plurality of integrated circuits. If embodied on a single integrated circuit, this single integrated circuit may optionally also include read only memory in addition to random access memory 112 used by the digital image/graphics processor(s).

Figure 2:
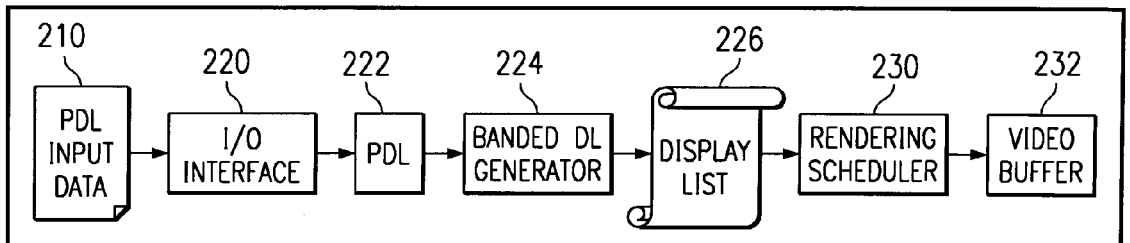
FIG. 2 is a block diagram of a banding system in a typical prior art banded mode printer.

FIG. 2 is a block diagram of a banding system in a typical prior art banded mode printer 200. In the banded mode, an entire page description 210 is received into the printer via interface 220 from a computer to which the printer is connected. The resultant set of PDL 222 is interpreted, and a series of rendering primitives, called a display list element (DLE), is built for the page. A display list (DL) generator 224 then bands a display list 226 and stores the DLEs in respective memory that is allocated for "each" band they fall into. A rendering scheduler 230 reads banded display list 226 and renders the rendering primitives in to a video buffer 232 band by band.

Figure 3:
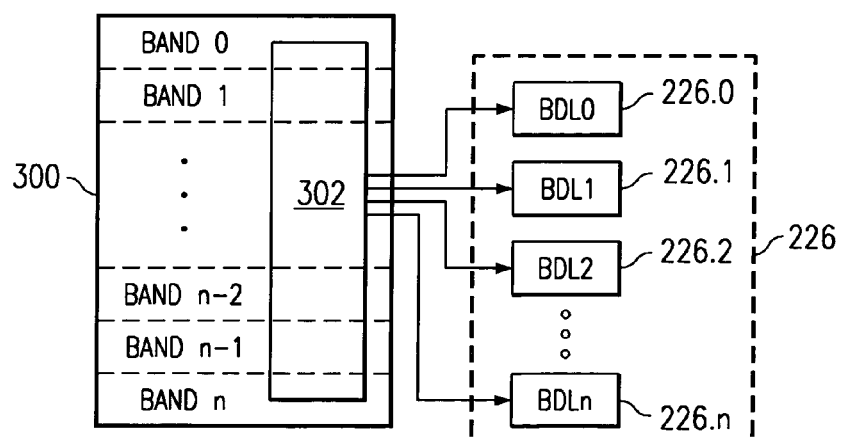
FIG. 3 is an illustration of a simple page to be printed with a rectangular element that spans several bands in the banded mode printer of FIG. 2.

A typical approach for banding the display list is as follows. Consider a simple page 300 with organized as a set of bands (band 0–band n). A rectangular box 302 spans across the page as shown in FIG. 3. Most known PDLs would generate a single trapezoid rendering primitive element for box 302 and hand it off to DL generator 224. DL generator 224 divides the page in to horizontal bands 0–n and builds a banded display list (BDL) 226.0–n for each band. BDLs 226.0–n are all embodied within BDL 226 of FIG. 2. A BDL is generated for a band by storing all the rendering primitives that are spawned within that band. Rendering scheduler 230 then fetches a BDL for each band from display list 228 and renders that band into video buffer 232.

The banded DL generation system illustrated in FIG. 2 is not an efficient way of storing the banded DLEs. This is due to storing the same rendering primitives in all the bands that a given graphic item spans. The result is that the same information will be stored in more than one BDL if an element spans across more than one band. This method increases the memory needed to store the BDLs if the band size is made smaller. For example, for the page shown in FIG. 3, all the BDLs 0–n will each contain the same DLE data for rectangle 302 that will be used for rendering.

If the band size is reduced, the DLEs may span across a larger number of bands and the BDL buffer size increases inordinately. This is a basic reason to have a limit on the band height (size) in most printer architectures. Sometimes this limit on band size forces printer system designer not to use on-chip memory as a video buffer.

Typically, size of the total Banded Display List happens to be in the range of 4–80 times the total size of the DLEs in the page.

$$\sum_{l=0}^{n} \{size\_of\ (BDLi)\ \} \gg size\_of\ (DLEs\ in\ the\ page).$$

Therefore, the memory blow-up is proportional to number of bands in which a particular DLE is spawned.

This blow-up is very critical in low-end memory laser/inkjet printers. Because of this blow-up a page will be forced unnecessarily in to compressed flow, which reduces the throughput of a printer and quality of a page when compared to high-end memory printers.

If the band size is small, the blow-up will be on the higher side. Typically this is the case if one tries to fit a band of page in on-chip memory of the processor to reduce external memory bandwidth. With the conventional banding approach, on-chip rendering is almost impractical.

Figure 4:
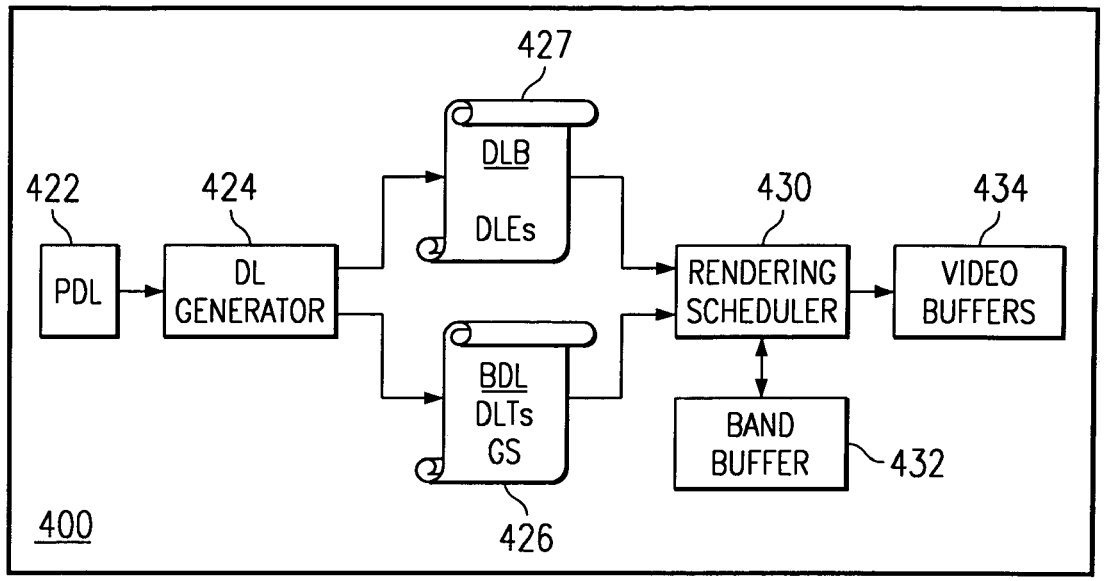
FIG. 4 is a block diagram of an improved banding system in which a page display list is stored as two different lists, according to an aspect of the present invention.

FIG. 4 is a block diagram of an improved banding system in which a page display list is stored as two different lists 426, 427 in printer 400, accordingto an aspect of the present invention. Printer 400 includes in I/O interface (not shown) similar to 220 for receiving an entire page description 210 from a computer or network to which the printer is connected. The resultant set of PDL 422 is interpreted, and a series of rendering primitives, called a display list element (DLE), is built for the page. A display list (DL) generator 424 then bands a display list and forms a list of display list templates (DLT) referred to as a Banded Display List (BDL) 426 and a second list containing all the render primitives (DLEs) of a page, referred to as Display List Buffer (DLB) 427. Rendering scheduler 430 reads banded display list 426 and renders the DLE rendering primitives pointed to in DLB 427 into a band buffer 432 band by band. Each rendered band is then transferred from band buffer 432 to video buffer 434 prior to printing a page. Video buffer 434 operates as a frame buffer where the bands for a given page are stored prior to printing the page.

Banded display list 426 contains display list template elements for render primitives that belong to each band and various graphic state (GS) elements that define a framework for rendering. The graphic state of a page is defined to be the current color used for filling traps, raster operations (ROP) (ROPs include OR, AND, NOT, XOR, etc) for performing raster operations on objects, and image patterns used to fill objects. When any of the above Color/ROP/Pattern changes, the GS is said to be changed. There is at least one graphic state for a page.

Figure 5:
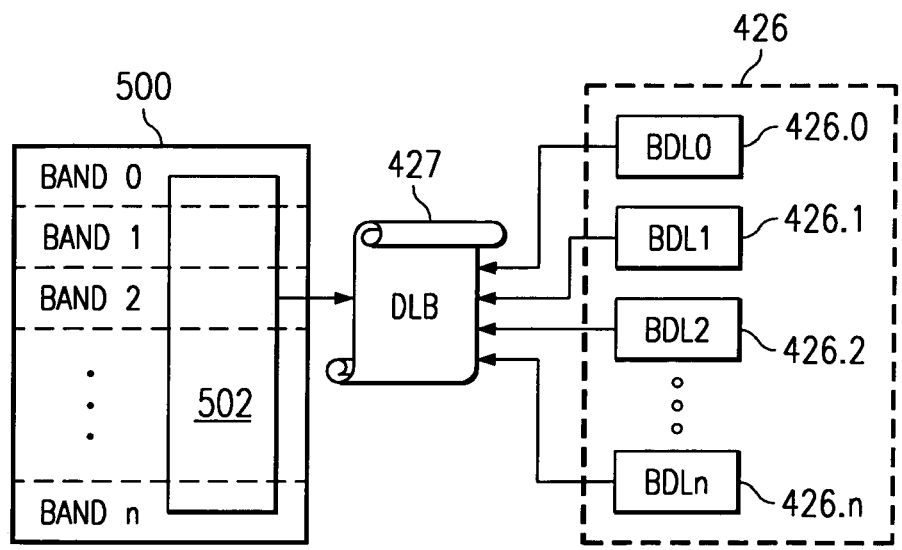
FIG. 5 is an illustration of a simple page to be printed with a rectangular element that spans several bands in the printer of FIG. 4.

In this approach, vector DLEs derived from PDL 422 are stored in DLB 427 and only their corresponding offset is stored as a DLT in each band in which the DLE is spawned. A Vector DLE is a structure defining a bounding box for a set of fonts/traps/images. It also has the details for every font/trap/images like bounding box, etc. Instead of storing vector DLEs in BDL 426, this approach stores smaller size DLTs in BDL buffer 426. This method saves memory proportional to the ratio of vector DLE size to DLT size whenever a vector DLE is spawned in more than one band FIG. 5 is an illustration of a simple page 500 to be printed with a rectangular element that spans several bands in the printer of FIG. 4. In this approach, the separate Display List Buffer 427 holds all the DLEs of the page, of which rectangle 502 is representative. Individual BDL buffers 426.0–n, which are embodied within BDL 426, contain a compact representation of each DLE that is spawned within the corresponding band, referred to as a Display List Template (DLT). In this approach, rectangle 502 DLE is stored in DLB 427 and its DLT is stored in all the bands (BDLs) where the rectangle spawns.

The DLT data structure is independent of the DLEs. With this improved approach, the memory blow-up is proportional to size of the DLTs.

$$\sum_{l=0}^{n} \{sizeof(BDLi)\} + sizeof(DLB)) > sizeof(DLEs\ in\ the\ page))$$

Since the DLT is a compact data structure, memory blow-up due to banding comes down by 50% on average. With this approach, the banded DL memory requirement is generally in the range of two to forty times of the total size of the DLEs in a given page. Thus, this approach allows very effective use of on-chip memory as a band buffer. Advantageously, when band buffer 432 is on-chip processing time is reduced because memory access time is generally shorter for on-chip memory than for off-chip memory.

The Display List Templates are defined for fonts/traps/images. The DL generator actually consists of three modules: trap_bander handles banding traps; font_bander handles banding fonts; and image_bander handles banding images. When, for example, a set of traps are passed by the PDL interpreter to the DL generator it actually goes to trap_bander. Trap_bander has to fill the information regarding the set of traps in DLB & BDL. The header and the traps are stored in the DLB. The DLT is stored in BDL.

The DL Template (DLT) is a key element of the new DL generator. The DLT has basically four fields, all allocated as short integers: Opcode, Num_Elements, Header_offset, and DLE_offset. The Opcode field describes the type of vector DLE, referred to as a trap, whether it is: Graphics, Bitmap, or Font. The Num_Elements field describes the number of elements in vector DLEs falling in the current band. The Header_Offset field gives the absolute offset of the bounding box in the DLB for a vector set of DLEs that are interpreted together, which is required for rendering the DLE properly. The DLE_Offset field gives the absolute offset in the DLB of the first element in the vector DLE corresponding to the DLT, which is being referring to. In some cases, there could be only one DLE in he DLT, in which case the above still holds true.

Using the DLTs, rendering scheduler 430 gets all the rendering primitives for a band. It is two step processes. In the first step, for a given band, rendering scheduler 430 gets the DLT(s) of the band from the corresponding BDL buffer 426.0–n. In step two, using the DLT, it gets the actual DLEs and it's headers from DL buffer 427.

In one embodiment, before the rendering actually begins, the DLB & DL are combined to generate 1K pages on-chip memory for rendering. The opcode field tells if it is font/trap/image. The num_elements field tells the number of fonts/traps/images. The header offset gives the header in the DLB that is copied from there to the 1K on-chip page. The DLE_offset gives the first trap offset in the DLB, thus the traps are copied (depending on the memory).

This approach minimizes the DL memory blow-up due to banding. This blow-up may go out of bounds when the band size is small. This is the scenario if one tries to fit band buffer 432 in on-chip memory of the processor. For example, if the band buffer size is 32 k, the reduction in blow-up is in the range of 25–75%. The amount of blow-up is dependent on page composition. Table 1 shows example reductions in DL blow-up using the improved unified display list banding method as described herein with respect to the conventional banding approach of FIG. 2.

For higher dot per inch (DPI) printers, DLEs that are spawned in more than one band are very common for most of the pages. In this case, this method provides an optimal method for storing the DLEs.

TABLE 1

Memory Improvement With Unified Display List (UDL) Banding Method.

| | | Banded DL Size in (KB) | | Blow-up in DL | | |
|---|---|---|---|---|---|---|
| | Actual DL Size | Improved Method | Conventional Method | Memory (factor of ADL) | | |
| File Names | (ADL) (KB) | (UDL Banding) | (CDL Banding) | UDL Banding | CDL Banding | Improvements (%) |
| Newsletter | 128 | 1093 | 1738 | 8.5 | 13.5 | 37 |
| AsianDragon | 1728 | 3719 | 6812 | 2.15 | 3.94 | 45 |
| Santabats | 2208 | 4804 | 9258 | 2.18 | 4.19 | 48 |
| Graphic | 2080 | 74529 | 181051 | 35.83 | 87.04 | 59 |
| Castle | 96 | 1872 | 6956 | 19.50 | 72.46 | 73 |

Note: improvement in table 1 is calculated as follows:

Improvement (%)=((*CDL* Banded *DL* Size−*UDL* Banded *DL* Size)/*CDL* Banded *DL* Size)*100

Blow-up in both UDL and BDL are calculated with respect to the Actual DL Size.

Table 2 shows processing times for two memory configurations of two files.

TABLE 2

Processing Times For Different Memory Configurations.

| | Processing (Interoperation + Rendering) Times in Seconds | |
|---|---|---|
| File Name | 64 MB Memory | 24 MB Memory |
| Newsletter | 8 | 8 |
| AsianDragon | 48 | 48 |

Advantageously, by limiting the display list memory blow-up, one can move the lower limit of the band size further down, i.e. band size can be made smaller without much system overhead, exploiting the maximum benefits of banding the Display List Elements.

Advantageously, this approach enables placing the band buffer in op-chip memory of the processors. This saves considerable bandwidth requirement of the processor and thus increases overall system performance.

Advantageously, due to avoiding a compress flow in most of the complex graphic pages, quality remains the same across all memory configurations through efficient memory usage. Thus, an efficient solution is allowed for all memory configurations.

Advantageously, because of the efficient banding, time (speed) advantages are seen in two kinds of scenario: a) for complex pages, it avoids the compression flow, b) for multi page files, more pages can be interpreted and stored in the form of display list in the printer pipeline for a given memory configuration. This will ensure fewer printer pipeline halts, thereby providing a speed advantage.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, various resolution printers, as well as color or black and white printers can make use of this improved banding technique.

In another embodiment, a different format for the DLT may be used. Other elements may be included in the DLT, instead of or in addition to the four elements described herein.

In another embodiment, the improved banded technique may be used to prepare images for use by devices other than printers, such as a personal digital assistant, for example, in which only a portion of a larger image is viewable at any one time. In this case, the full image is equivalent to a page, and the smaller viewed portion is treated as one or more bands.

In another embodiment, the bands may be shaped differently than a horizontal band across a page. For example, a band may be a smaller region that does not completely encompass the width of the page, such that two or more horizontally contigent bands together fully encompass the width of the page. Similarly, the bands may be oriented in a vertical manner on a page, especially if a printer is designed to print pages in a landscape manner.

It is therefore contemplated that the appended claims will cover any such modifications of the embodiments as fall within the true scope and spirit of the invention.

What is claimed is:

1. A method of generating an image having a plurality of bands, comprising the steps of:
   receiving a page description representative of elements of the image;
   building a display list buffer having a plurality of display list elements (DLE) derived from the page description, each display list element being representative of a corresponding graphic item; and
   building a banded display list representative of the plurality of bands of the image, wherein for each band of the plurality of bands a set of templates is stored in the banded display list in which each template points to a DLE in the display list buffer for each corresponding graphic item that is spawned within the band.

2. The method of claim 1, further comprising the step of rendering each band by using the set of templates stored for that band to access a corresponding set of DLEs from the display list buffer.

3. The method of claim 1, wherein each template contains an opcode field that describes the DLE being pointed to.

4. The method of claim 1, wherein each template contains a number of elements field that specifies a number of elements of a vector DLE being pointed to that falls within the band.

5. A method of generating an image having a plurality of bands, comprising the steps of:
   receiving a page description representative of elements of the image;
   building a display list buffer having a plurality of display list elements (DLE) derived from the page description, each display list element being representative of a corresponding graphic item; and
   building a banded display list representative of the plurality of bands of the image, wherein for each band of the plurality of bands a set of templates is stored in the banded display list in which each template points to a DLE in the display list buffer for each corresponding graphic item that is spawned within the band, wherein each template contains a header offset field that specifies a bounding box in the display list buffer for a vector set of DLEs that are interpreted together.

6. A method of generating an image having a plurality of bands, comprising the steps of:
   receiving a page description representative of elements of the image;
   building a display list buffer having a plurality of display list elements (DLE) derived from the page description, each display list element being representative of a corresponding graphic item; and
   building a banded display list representative of the plurality of bands of the image, wherein for each band of the plurality of bands a set of templates is stored in the banded display list in which each template points to a DLE in the display list buffer for each corresponding graphic item that is spawned within the band, wherein each template contains a DLE offset field that specifies an offset in the display list buffer of the first element of a vector set of DLEs that is being pointed to.

7. A method of generating an image having a plurality of bands, comprising the steps of:
   receiving a page description representative of elements of the image;
   building a display list buffer having a plurality of display list elements (DLE) derived from the page description, each display list element being representative of a corresponding graphic item;
   building a banded display list representative of the plurality of bands of the image, wherein for each band of the plurality of bands a set of templates is stored the banded display list in which each template points to a DLE in the display list buffer for each corresponding graphic item that is spawned within the band, wherein each template comprises opcode field that describes the DLE being pointed to, a number of elements field that specifies a number of elements of a vector DLE being pointed to that falls within the band, a header offset field that specifies a bounding box in the display list buffer for a vector set of DLEs that are interpreted together, and a DLE offset field that specifies an offset in the display list buffer of the first element of a vector set of DLEs that is being pointed to; and
   rendering each band by using the set of templates stored for that band to access a corresponding set of DLEs from the display list buffer.

8. An image processing system that renders a graphical image in a banded manner, the system comprising:
   a microprocessor contained on a single integrated circuit connected to an on-chip memory within the integrated circuit;
   an image buffer memory connected to the microprocessor to receive rendered bands;
   means for displaying the image connected to receive each rendered band for display; and
   wherein the microprocessor is operable to prepare a page having a plurality of bands for display by performing the steps of:
   receiving a page description representative of elements of the image;
   building a display list buffer having a plurality of display list elements (DLE) derived from the page description, each display list element being representative of a corresponding graphic item;
   building a banded display list representative of the plurality of bands of the image, wherein for each band of the plurality of bands a set of templates is stored in the banded display list in which each template points to a DLE in the display list buffer for each corresponding graphic item that is spawned within the band; and
   rendering each band by using the set of templates stored for that band to access a corresponding set of DLEs from the display list buffer.

9. The system of claim 8, wherein the step of rendering comprises loading a set of templates for each of the plurality of bands into the on-chip memory.

10. The system of claim 9, wherein the image buffer is a band buffer located in the on-chip memory and wherein the plurality of templates for each of the plurality of bands is loaded into the on-chip memory together with the band buffer.

11. The system of claim 8 being a printer, wherein the means for displaying is a print engine connected to receive each rendered band for printing.

* * * * *